US009624688B1

(12) United States Patent
Tyson

(10) Patent No.: US 9,624,688 B1
(45) Date of Patent: Apr. 18, 2017

(54) INFLATABLE SLEEPER APPARATUS

(71) Applicant: Michael Tyson, Charlotte, NC (US)

(72) Inventor: Michael Tyson, Charlotte, NC (US)

( * ) Notice: Subject to any disclaimer, the term of this patent is extended or adjusted under 35 U.S.C. 154(b) by 0 days.

(21) Appl. No.: 14/735,464

(22) Filed: Jun. 10, 2015

(51) Int. Cl.
*E04H 15/20* (2006.01)
*B60P 3/32* (2006.01)
*A47C 27/08* (2006.01)

(52) U.S. Cl.
CPC ........... *E04H 15/20* (2013.01); *A47C 27/081* (2013.01); *B60P 3/32* (2013.01); *E04H 2015/201* (2013.01); *E04H 2015/206* (2013.01); *E04H 2015/208* (2013.01)

(58) Field of Classification Search
CPC ....... E04H 15/20; E04H 15/06; E04H 15/324; E04H 15/56; E04H 2015/208; E04H 2015/201; A47C 27/081; A47C 27/082; B60P 3/38; B60P 3/32
USPC ................... 135/88.03, 88.13, 96, 137, 116; 5/12–113, 118, 902; 296/159, 100.18, 296/163–165, 167
See application file for complete search history.

(56) References Cited

U.S. PATENT DOCUMENTS

| | | | | |
|---|---|---|---|---|
| 2,754,836 A * | 7/1956 | Darby | ..................... | E04H 15/20 52/2.21 |
| 2,854,014 A * | 9/1958 | Hasselquist | ............... | E04H 9/16 114/349 |
| 2,875,771 A * | 3/1959 | Brewin | ................... | E04H 15/20 52/2.11 |
| 4,197,681 A * | 4/1980 | Holcombe | ............. | E04C 3/005 135/119 |
| 4,296,960 A * | 10/1981 | Winchester | ............... | B60P 3/32 135/88.13 |
| 5,061,235 A * | 10/1991 | Hogan | ................... | A61B 16/00 27/28 |
| 5,226,261 A * | 7/1993 | Wilbourn | ................. | B60J 7/102 52/2.21 |
| 5,247,768 A * | 9/1993 | Russo | ..................... | E04H 15/20 52/2.13 |
| 5,570,544 A * | 11/1996 | Hale | ....................... | E04H 15/20 52/2.11 |
| 5,692,795 A | 12/1997 | Mininger | | |
| 6,708,451 B1 * | 3/2004 | Gomes | .................... | E04H 15/20 135/87 |

(Continued)

FOREIGN PATENT DOCUMENTS

JP 11152939 A * 6/1999

*Primary Examiner* — Winnie Yip
(74) *Attorney, Agent, or Firm* — Stevenson IP, LLC

(57) ABSTRACT

An inflatable sleeper including an inflatable support skeleton of spaced apart parallel tubular arches and an inflatable mattress having an air inlet-outlet valve and further including a waterproof cover, which has an arched door parallel to the arches, removably attached to and covering the entire support skeleton when the support skeleton is in an inflated condition. Each arch has a pair of outer ends attached to and in fluid communication with a bottom edge of the mattress. Spaced apart fasteners, such as hook and loop fasteners, on the arches secure the cover and the support skeleton together. Spaced apart tie down eyelets on the cover are configured to receive a tie down fastener, such as a rope, therethrough to secure the cover and support skeleton to one of a pickup truck bend interior side and a ground stake. The mattress rests atop a separate foldable floor provided.

10 Claims, 5 Drawing Sheets

(56) References Cited

U.S. PATENT DOCUMENTS

| | | | |
|---|---|---|---|
| 6,929,016 B2 * | 8/2005 | Lee | E04H 15/20 |
| | | | 135/126 |
| 7,021,694 B1 | 4/2006 | Roberts et al. | |
| 8,550,538 B1 | 10/2013 | Brandenburg | |
| 2008/0060691 A1 * | 3/2008 | Harker | E04H 15/36 |
| | | | 135/95 |
| 2009/0107020 A1 * | 4/2009 | Aires | G09F 7/00 |
| | | | 40/610 |

* cited by examiner

INFLATABLE SLEEPER APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of truck bed mountable shelters to provide accommodations for sleeping are in use and are known in the prior art, but such shelters are frequently bulky, cumbersome, and unsightly, and also prevent the rear cab portion from being used to move cargo or for other purposes. The present invention allows for a sturdy, safe sleeper apparatus to be either employed as a standalone sleeper or connected to a pickup truck bed, but allowing the sleeper apparatus to be easily detached and deflated when not in use.

FIELD OF THE INVENTION

The inflatable sleeper apparatus is in the field of tent type shelters for pickup truck beds.

SUMMARY OF THE INVENTION

The inflatable sleeper apparatus is devised to provide a comfortable and convenient inflatable shelter which is provided as a standalone sleeper and is also removably attachable within a pickup truck bed. The instant apparatus includes a substantially quonset-shaped inflatable support skeleton of spaced apart parallel tubular arches parallel to each other. Each of the arches has a pair of outer ends attached to and in fluid communication with an inflatable mattress, which forms a portion of the support skeleton, at a bottom edge of the mattress. An air inlet-outlet valve disposed in the support skeleton is attached to a hose in operational communication with a source of air flow. A waterproof cover extends over the support skeleton and includes an arched door with the tubular arches being parallel to the door. A plurality of spaced apart fasteners, such as hook and loop fasteners, is disposed along each of the arches and engage an inner side of the cover to secure the cover to the support skeleton. In the inflated condition, the support skeleton can be used as a standalone sleeper or can be configured to conform to a width and a length of the pickup truck bed with the door disposed proximal a rear bumper of the pickup truck. A foldable floor is provided to protect the mattress from deflation by sharp objects, to provide additional cushioning, and to assist in insulating the mattress from temperature variations. At least one pair of spaced apart tie down eyelets is disposed on the cover on each of a right side and a left side thereof to secure the cover to either the pickup truck bed or to a ground stake when the device is employed as a standalone sleeper. A magnetic closure is centrally disposed in the door. In addition, at least one opening is provided on a front side of the cover to accommodate4 air conditioning and heating connections.

The present apparatus provides a weatherproof enclosure for rest while on an overnight trip, such as a camping, fishing, or hunting trip. Because the instant inflatable sleeper provides above-ground, enclosed accommodations that are secured within the pickup truck bed, the user is protected from potentially adversities, such as snakes, insects, wind, rain, and bird droppings, and is afforded privacy. The apparatus also collapses for compact storage. Unlike a traditional tent, the present inflatable sleeper lacks metal poles, telescopic poles, and stakes, which tend to be lost.

DETAILED DESCRIPTION OF THE DRAWINGS

Figure 1:
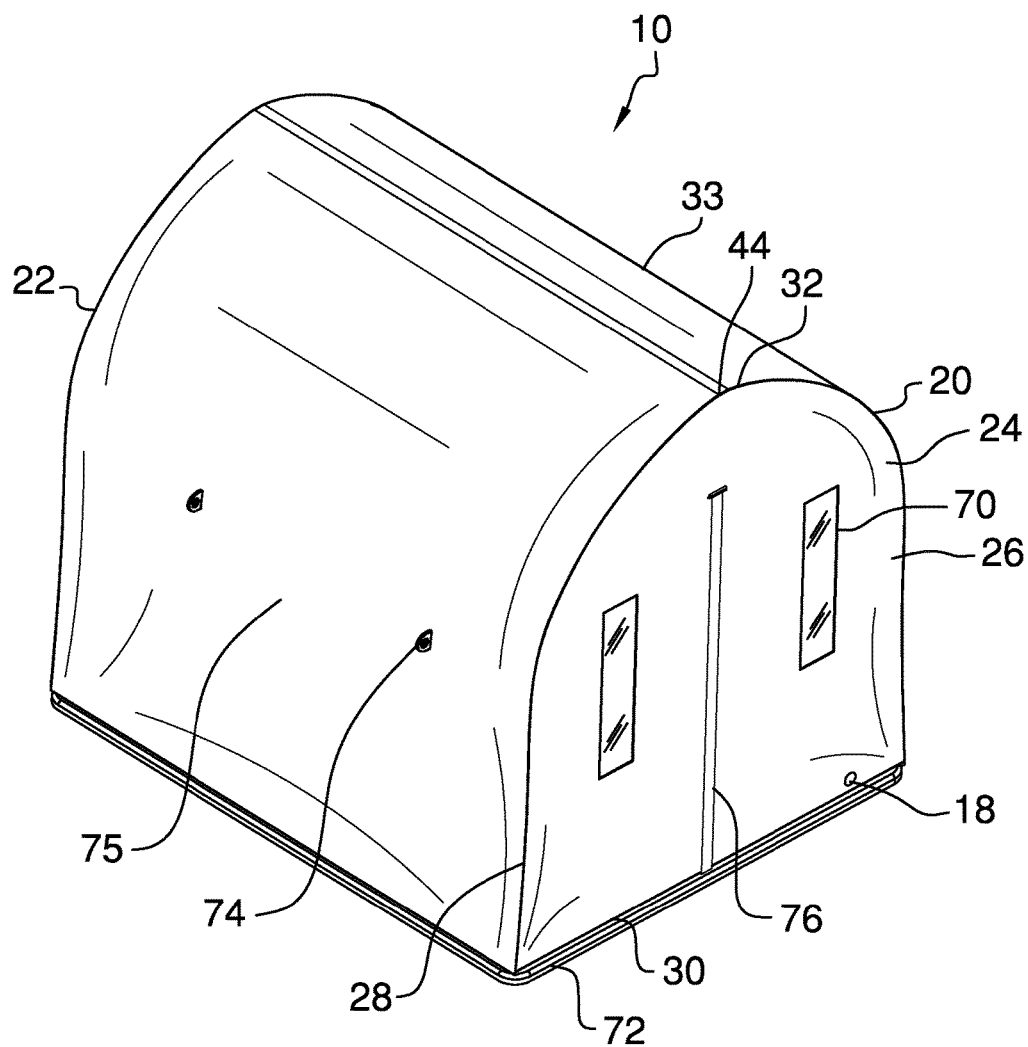
FIG. 1 is an isometric view.
Figure 2:
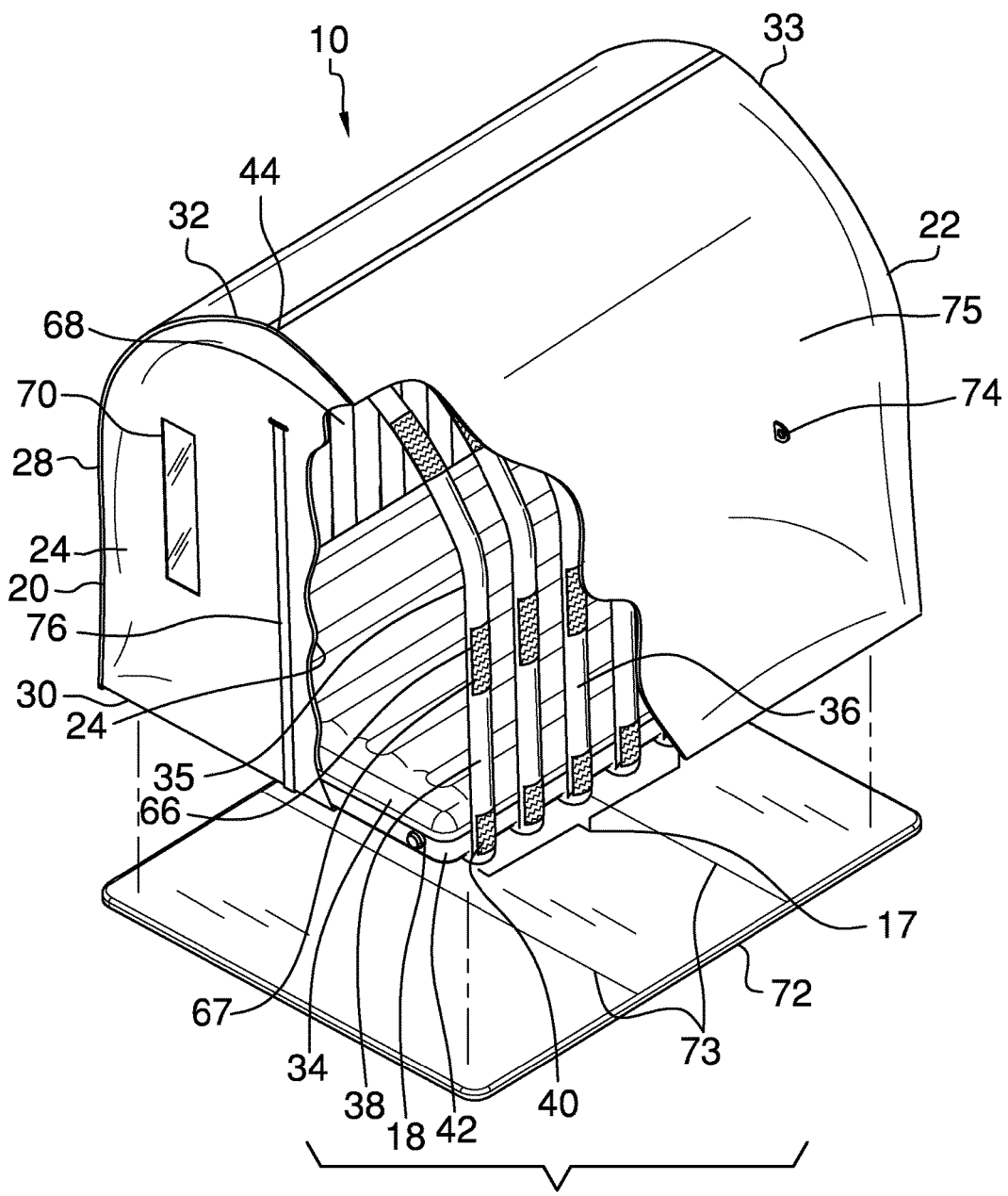
FIG. 2 is an exploded rear isometric view with a partial cutaway view of a support skeleton.
Figure 3:
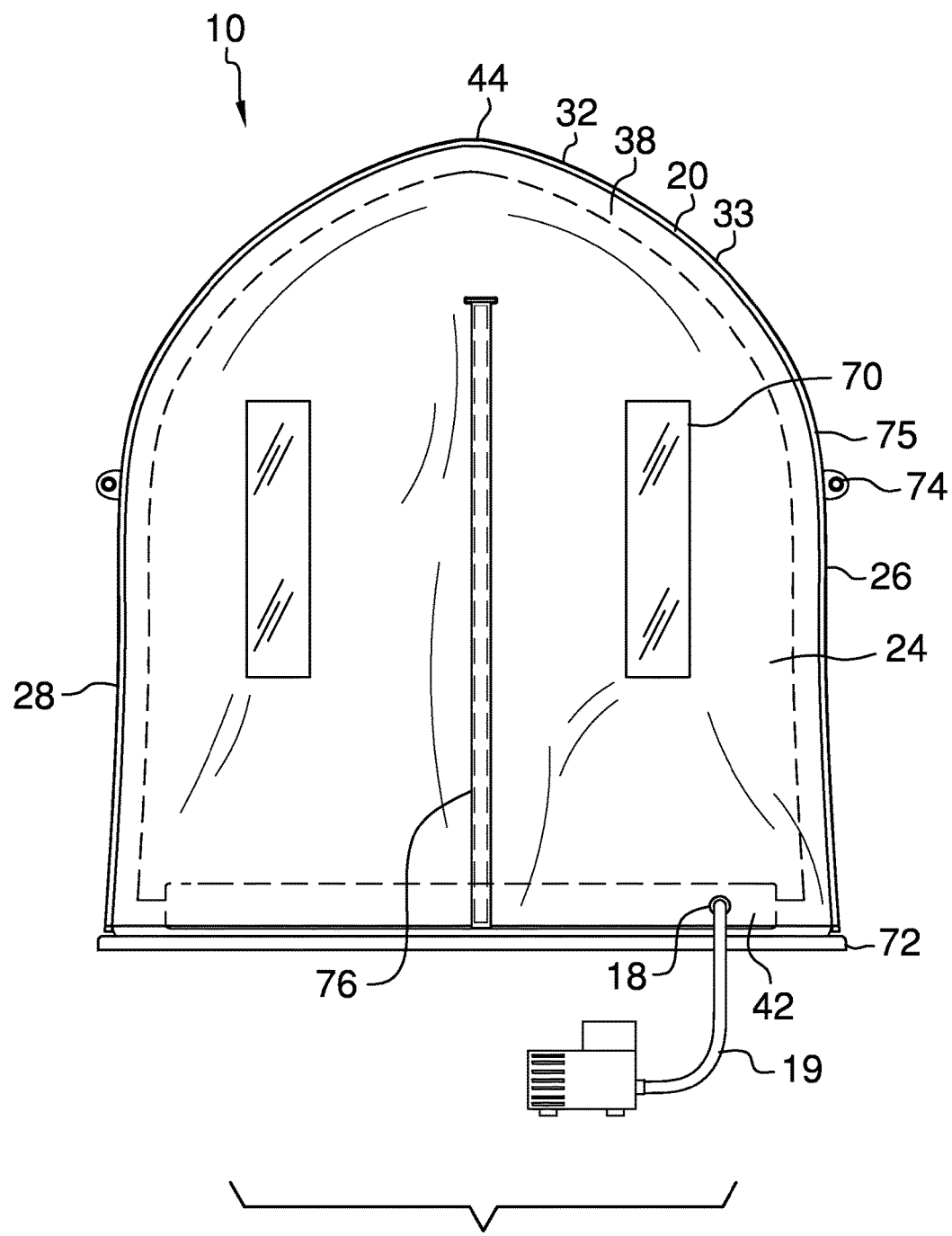
FIG. 3 is a rear elevation view.
Figure 4:
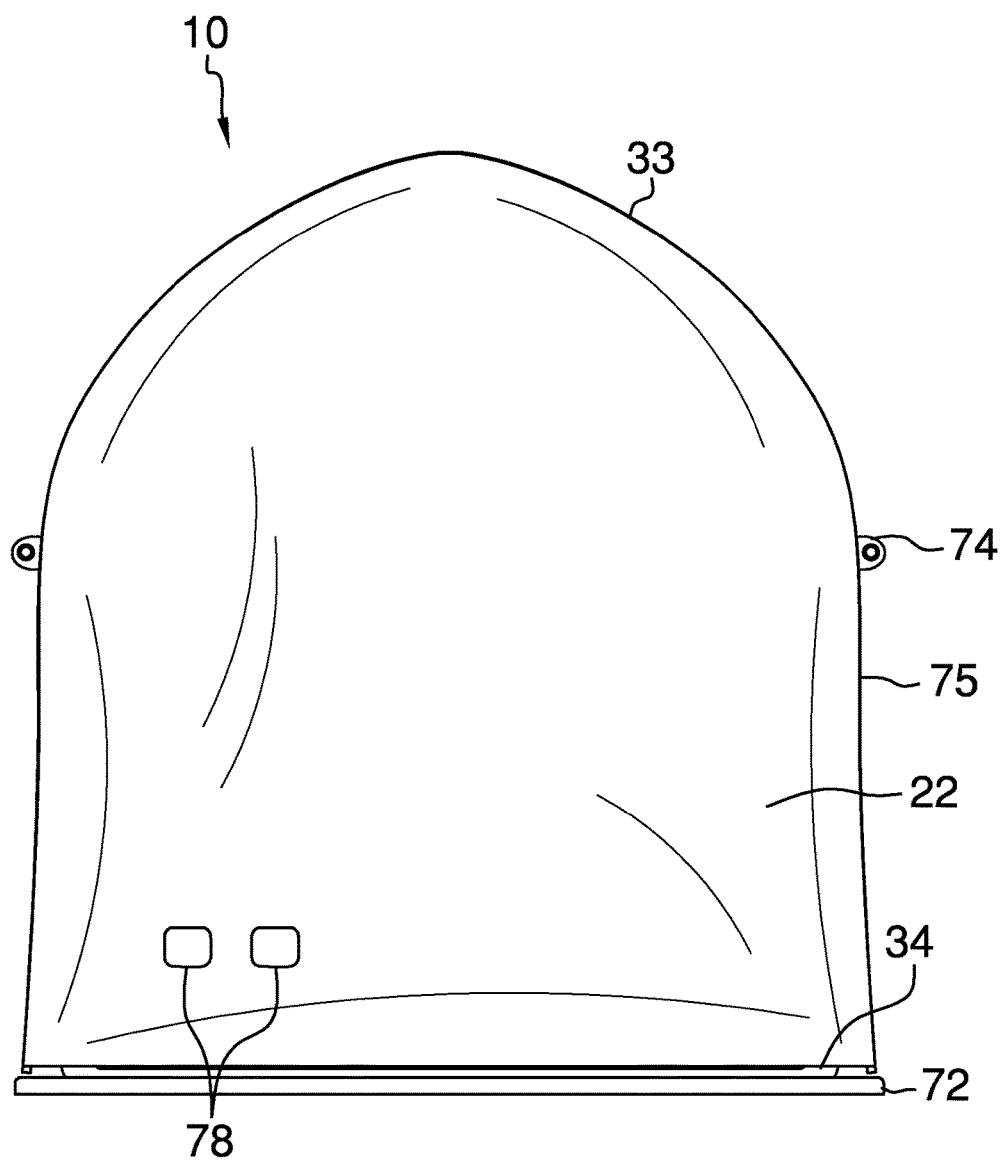
FIG. 4 is a front elevation view.
Figure 5:
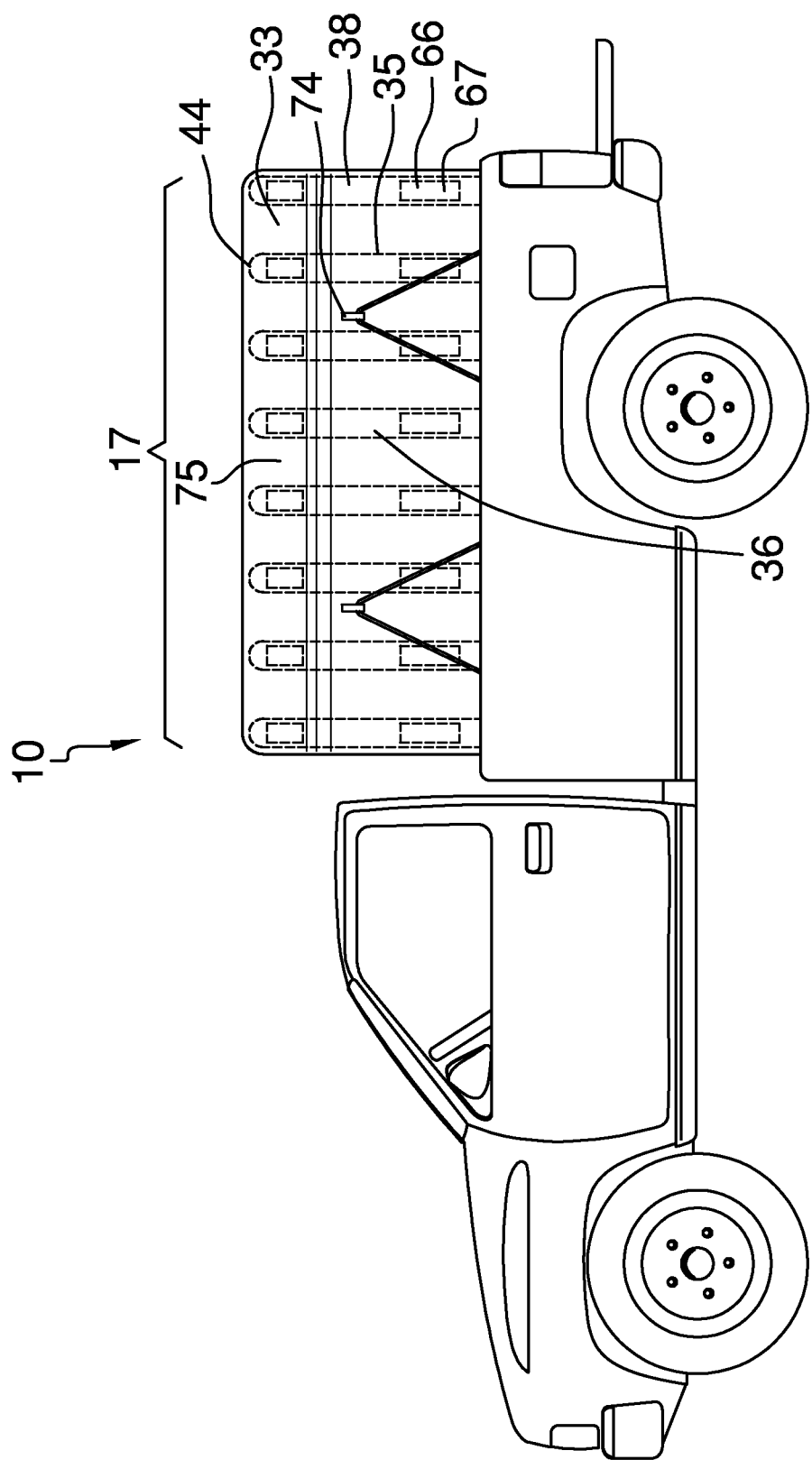
FIG. 5 is an in-use side elevation view.

With reference now to the drawings, and in particular FIGS. 1 through 5 thereof, an example of the inflatable sleeper apparatus employing the principles and concepts of the present invention and generally designated by the reference number 10 will be described.

Referring to FIGS. 1 through 5, the inflatable sleeper apparatus 10 disclosed herein can be employed as a standalone sleeper device or can be placed atop and conform to a pickup truck bed. The present inflatable sleeper apparatus 10 includes a substantially quonset-shaped inflatable support skeleton 17 having an air inlet-outlet valve 18 attached to a hose 19 in operational communication with a source of air flow, such as a portable air pump. Upon activation of the air flow source, air flows through the hose 19 and the air inlet-outlet valve 18 and into the inflatable support skeleton 17 to inflate the inflatable support skeleton 17 in an inflated condition. Upon deactivation of the air flow source, the inflatable support skeleton 17 deflates and collapses. A waterproof cover 33 extends over the entire support skeleton 17. The cover 33 includes an arched door 20, a front side 22, a rear side 24, a right side 26, a left side 28, a bottom portion 30, and an upper arch portion 32. The cover 33 can be formed of canvas or other durable weather-resistant lightweight waterproof fabric materials.

The inflatable support skeleton 17 includes a plurality of spaced apart parallel single-construction tubular arches 35 parallel to the door 20 and an inflatable mattress 34. The air inlet-outlet valve 18 is disposed in the mattress 34. The arches 35 are in fluid communication with the mattress 34. The arches 35 include at least one middle arch 36, a rear arch 38 disposed proximal the door 20, and a front arch 39 disposed proximal the front side 22, each of which is disposed in a position parallel to the door 20. Each of the upper arch portion 32 and the middle and rear arches 36, 38 has a pair of outer ends 40 attached to and in fluid communication with the mattress 34 at a bottom edge 42 of the mattress 34. Each of the upper arch portion 32, the middle arch 36, the rear arch 38, and the front arch 39 has an apex 44. The relationship of the components of the inflatable support skeleton 17 is described in the inflated condition.

A plurality of spaced apart fasteners 66, such as hook and loop fasteners 67, is continuously disposed along each of arches 35. The fasteners 66 engage an inner side 68 of the cover 33 to secure the cover 33 to the support skeleton 17. At least one of the fasteners 66 is disposed on each arch 35 proximal each of the mattress 34 and the apex 44. At least one transparent window 70 is disposed in the door 20.

In the inflated condition, the inflatable support skeleton 17 can be a standalone sleeper or can be sized to conform to a width and a length of the pickup truck bed with the door 20 disposed proximal a rear bumper of the pickup truck.

A foldable floor 72 is provided to protect the mattress 34 from deflation by sharp objects, to provide additional cushioning, to prevent the mattress from getting wet, and to assist in insulating the mattress from temperature variations. The floor 72 has a width and a length equal to a width and a length of the mattress 34. Score lines 73 in the floor 72 permit the floor 72 to be folded. The floor 72 is preferably rubberized.

At least one pair of spaced apart tie down eyelets 74 is disposed on the cover 33 on each of the right and left sides 26, 28 of the cover 33 at a longitudinal midpoint of each of the right and left sides 26, 28. The tie down eyelets 74 are configured to receive a tie down fastener, such as a rope, therethrough to attach the cover 33 and to secure the support skeleton 17 to either a pickup truck bed interior side or to a ground stake when the device 10 is being employed as a standalone sleeper.

A magnetic closure 76 is centrally disposed in the door 20 from proximal the apex 44 to the bottom portion 30. In addition, at least one opening 78 is provided in the front side 22 of the cover 20 to accommodate air conditioning and heating connections.

What is claimed is:

1. An inflatable sleeper apparatus comprising:
a substantially quonset-shaped inflatable support skeleton comprising:
an air inlet-outlet valve in the inflatable support skeleton, wherein a hose is attachable to the air inlet-outlet valve on one end of the hose and to a source of air flow on an opposite end of the hose;
wherein upon activation of the air flow source, the inflatable support skeleton transforms from a collapsed condition into an inflated condition;
a waterproof cover extending over and removably attached to the support skeleton when the support skeleton is in the inflated condition, the cover comprising:
an arched door,
a front side and a rear side;
a right side and a left side;
a bottom portion;
an upper arch portion;
wherein in the inflated condition, the inflatable support skeleton comprises:
a plurality of spaced apart parallel single-construction tubular arches parallel to the door, each arch having a pair of outer ends;
an inflatable mattress having a bottom edge, wherein the outer ends of each arch is attached to and is in fluid communication with the bottom edge of the mattress;
a plurality of spaced apart fasteners continuously disposed along each arch, the fasteners being attachable to an interior side of the cover;
at least one pair of spaced apart tie down eyelets disposed on the cover on each of the right side and left side thereof at a longitudinal midpoint of each of the right and left sides, each of the eyelets configured to receive a tie down fastener therethrough to secure the cover and the support skeleton to one of a truck bed interior side and a ground stake; and
a magnetic closure centrally disposed in the door from proximal the apex to the bottom portion.

2. The inflatable sleeper apparatus of claim 1 further comprising:
at least one opening in the front side of the cover to accommodate air condition and heating connections.

3. The inflatable sleeper apparatus of claim 1 further comprising:
a foldable floor having a width and a length equal to a width and length of the mattress.

4. The inflatable sleeper apparatus of claim 1 wherein the support skeleton is sized to conform to a width and a length of a pickup truck bed.

5. An inflatable sleeper apparatus comprising:
a substantially quonset-shaped inflatable support skeleton comprising:
an air inlet-outlet valve in the inflatable support skeleton, wherein a hose is attachable to the air inlet-outlet valve on one end of the hose and to a source of air flow on an opposite end of the hose;
wherein upon activation of the air flow source, the inflatable support skeleton transforms from a collapsed condition into an inflated condition;
a waterproof cover extending over and removably secured to the support skeleton when the support skeleton is in the inflated condition, the cover comprising:
an arched door having a centrally disposed magnetic closure extending from proximal the apex to the bottom portion and at least one window,
a front side and a rear side;
a right side and a left side;
a bottom portion;
an upper arch portion;
wherein in the inflated condition, the inflatable support skeleton comprises:
a plurality of spaced apart parallel single-construction tubular arches parallel to the door, each arch having a pair of outer ends, the tubular arches comprising at least one middle arch, a rear arch disposed proximal the door, and a front arch disposed proximal the front side;
an inflatable mattress having a bottom edge, wherein the outer ends of each arch is attached to and is in fluid communication with the bottom edge of the mattress;
a plurality of spaced apart hook and loop fasteners continuously disposed along each arch, the fasteners being attachable to an interior side of the cover;
at least one pair of spaced apart tie down eyelets disposed on the cover on each of the right side and left side thereof at a longitudinal midpoint of each of the right and left sides, each of the eyelets configured to receive a tie down fastener therethrough to secure the cover and the support skeleton to one of a pickup truck bed interior side and a ground stake.

6. The inflatable sleeper apparatus of claim 5 further comprising at least one opening in the front side of the cover, wherein the at least one opening is configured to accommodate an air conditioning and heating connection.

7. The inflatable sleeper apparatus of claim 6 further comprising a foldable floor having a width and a length equal to a width and length of the mattress.

8. The inflatable sleeper apparatus of claim 7 wherein the floor is rubberized.

9. The inflatable sleeper apparatus of claim 7 wherein the support skeleton is sized to conform to a width and a length of a pickup truck bed.

10. The inflatable sleeper apparatus of claim 8 wherein the support skeleton is sized to conform to a width and a length of a pickup truck bed.

* * * * *